United States Patent [19]
de Baan et al.

[11] Patent Number: 5,275,510
[45] Date of Patent: Jan. 4, 1994

[54] OFFSHORE TANKER LOADING SYSTEM

[76] Inventors: Jacob de Baan, Kamerlingh Onnesdreef 8, 3146 BH Maassluis, Netherlands; Willem J. van Heijst, Ch-Fenetta 35, 1752 Villars-sur-Glane, Switzerland

[21] Appl. No.: 823,104

[22] Filed: Jan. 16, 1992

[51] Int. Cl.⁵ ............................................. F16L 1/12
[52] U.S. Cl. .................................. 405/171; 405/168.1; 405/205; 405/210
[58] Field of Search .................. 405/166, 168.1, 168.3, 405/168.4, 171, 205, 210, 195.1

[56] References Cited

U.S. PATENT DOCUMENTS

| | | | |
|---|---|---|---|
| 3,668,878 | 6/1972 | Jones et al. | 405/168.4 X |
| 4,498,812 | 2/1985 | Lanfranconi et al. | 405/168.3 X |
| 4,563,108 | 1/1986 | Ayers | 405/168.1 X |
| 4,687,378 | 8/1987 | Jegousse et al. | 405/168.1 X |
| 4,810,133 | 3/1989 | Kopp et al. | 405/168.1 |
| 4,909,670 | 3/1990 | Harrison | 405/171 |

FOREIGN PATENT DOCUMENTS 2239441A 8/1991 United Kingdom.

OTHER PUBLICATIONS

"Statfjord A Offshore Loading System (UKOLS)", paper presented at OTC in Houston, Tex., May 2-5, 1988 by K. Mork, Ugland Engineering A/S.

Primary Examiner—Dennis L. Taylor
Assistant Examiner—J. Russell McBee

[57] ABSTRACT

The present invention relates to an improved flexible loading system which provides fluid communication between a subsea pipeline and a surface vessel including a hose extending from the subsea pipeline to a first buoyancy tank, a second hose extending from the first buoyancy tank to a central buoyancy tank, a second buoyancy tank, means connecting said second buoyancy tank to the sea floor and to the central buoyancy tank whereby the forces exerted on said central buoyant tank by said second hose and said connecting means are balanced to cause said central buoyancy tank to maintain a preselected position, a riser section extending upwardly from said central buoyancy tank and means on the upper termination for engagement by a vessel on the surface to raise said upper termination onto the vessel to complete the communication for moving fluids between the subsea pipeline and the vessel. In one form the means for connecting between the sea floor to the second buoyancy tank includes an anchor on the sea floor and lines extending from the anchor to the second buoyancy tank and from the second buoyancy tank to the central buoyancy tank. In another form of the invention the means for connecting is a third hose extending from a second subsea pipeline to the second buoyancy tank and a fourth hose extending from the second buoyancy tank to the central buoyancy tank. The central buoyancy tank is preferred to be maintained at a level below the water surface which allows full movement of the vessel while connected to the riser section. A swivel may be positioned in the riser section and a pressure relief system may be included in the loading system to protect it from sudden excess pressures.

9 Claims, 15 Drawing Sheets

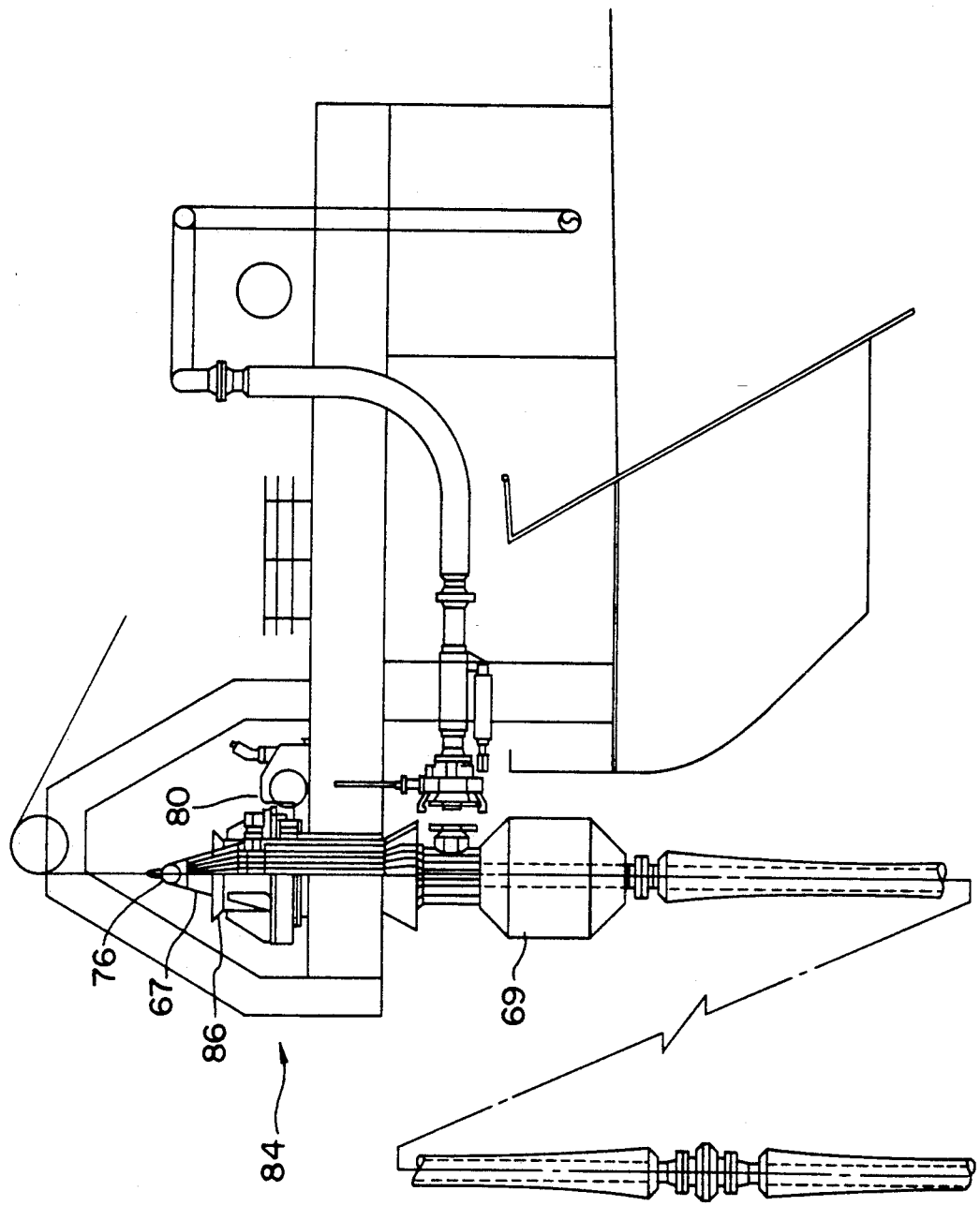

OFFSHORE TANKER LOADING SYSTEM

BACKGROUND

The present invention relates to an offshore tanker loading system. Prior to the present invention, single point mooring (SPM) terminals have been used. These terminals were normally in relatively unsheltered waters and allowed the tanker to be aligned with the main weather direction much like a weather vane. The mooring hawser plays a key part in the above-described situation, as this element effectively ties the tanker to the SPM terminal while carrying all the environmental loads and allowing for all wave induced motions of the vessel. Further, for all intents and purposes, the tanker has, while it remains moored, become a "dead" ship.

Modern technology has made it possible for many ships to stay on a specific offshore location by means of their propulsive systems. These propulsive systems have to meet certain requirements, such as output thrust and power should be continuously variable in magnitude and direction. Also, the propulsive system is tied to a data acquisition system which monitors and measures the magnitude and direction of wind, current and waves, as well as the actual position of the ship. The direction and magnitude of the propulsive thrust is adjusted on a continuous basis to counter the continuously varying environmental forces which act on the ship and which would normally urge it to move off its desired location. Ships fitted with such a propulsive system are referred to as Dynamically Positioned (DP) ships.

In the offshore oil industry, such ships are of great importance because they allow a quick turn-around time in loading or unloading their cargo, as no SPM operation needs to be performed. These SPM operations are time consuming and sometimes, due to weather, even impossible. The DP tanker, however, requires a flexible loading system for its cargo and the present invention is directed to such loading system.

An example of such loading system is disclosed in the paper OTC 5747 given at the Offshore Technology Conference in Houston, Texas, May 2-5, 1988 by K. Mork, Ugland Engineering A/S and entitled "Stratfjord 'A' Offshore Loading System (UKOLS)" This system has been used but has a number of disadvantages. The main disadvantage is that, once the tanker loading operation is completed, the hose has to be laid back onto the sea floor. If the hose termination normally attached to the tanker were left afloat, the overall geometry of the system could lead to entanglement of the various parts Subsea swivels could alleviate some of this risk. Another disadvantage is the fact that the "operating area" of the tanker, when it is connected to the UKOLS, is described by a ring-shaped area. The center area of the ring is a "no-go" area for the tanker, as it would mean that the portion of the hose connected to the tanker would be in continuous contact with the subsea buoy. This contact results in chafing of the hose portion contacting the buoy. One other disadvantage to the ring-shaped operating area, when compared with a full-circle operating area, is that when wind or current change direction, more energy is required to keep the ship within the operating area. This is due to the fact that not only a change of the ships heading has to be achieved, but also a lateral displacement. If the operating area is a full circle, one could position the tanker in the center and merely change the heading when current and wind dictate such change.

Another mooring system is described in the patent application in Great Britain GB 2.239.441A. This system requires the use of a powered turntable on the tanker in order to overcome internal friction loads in the fluid swivel arrangement. Also, the complexity of the hook-up operation, which requires the load to be transferred from an initial pull-in line to a final hook-up line, is considered to be a difficult and hazardous operation to personnel.

SUMMARY

The present invention relates to an improved flexible loading system which provides fluid communication between a subsea pipeline and a surface vessel, including a hose extending from the subsea pipeline to a first buoyancy tank, a second hose extending from the first buoyancy tank to a central buoyancy tank or spider frame, a second buoyancy tank, means connecting said second buoyancy tank to the sea floor and to the central buoyancy tank or spider frame whereby the forces exerted on said central buoyancy tank by said second hose and said connecting means are balanced to cause said central buoyancy tank or spider frame to maintain a preselected position, a riser section extending upwardly from said central buoyancy tank and means on the upper termination for engagement by a vessel on the surface to raise said upper termination onto the vessel to complete the communication for moving fluids between the subsea pipeline and the vessel. In one form the means for connecting between the sea floor to the second buoyancy tank includes an anchor on the sea floor and lines extending from the anchor to the second buoyancy tank and from the second buoyancy tank to the central buoyancy tank. In another form of the invention the means for connecting is a third hose extending from a second subsea pipeline to the second buoyancy tank and a fourth hose extending from the second buoyancy tank to the central buoyancy tank or spider frame. The central buoyancy tank or spider frame is preferred to be maintained at a level below the water surface which allows full movement of the vessel while connected to the riser section. A swivel may be positioned in the riser section and a pressure relief system may be included in the loading system to protect it from sudden excess pressures.

An object of the present invention is to provide an improved tanker mooring and load transfer system that is simple and does not require unnecessary manipulation by the tanker crew.

Another object of the present invention is to provide an improved tanker load transfer system that allows the tanker to shift positions to accommodate for the changes in wind and tide directions within a circular area centered on the load transfer point.

A further object is to provide an improved tanker load transfer system in which the connection and handling are not hazardous to the crew.

Still another object of the present invention is to provide a tanker load transfer system for use by a DP tanker in which the system is fail-safe when the tanker has disconnected and departed from the area.

BRIEF DESCRIPTION OF THE DRAWINGS

These and other objects and advantages are hereinafter set forth with respect to the drawings wherein:

FIG. 5A is a schematic view illustrating the upper hose section which has been drawn into a housing on board the tanker with a single wire.

DESCRIPTION OF THE PREFERRED EMBODIMENTS

Figure 5B:
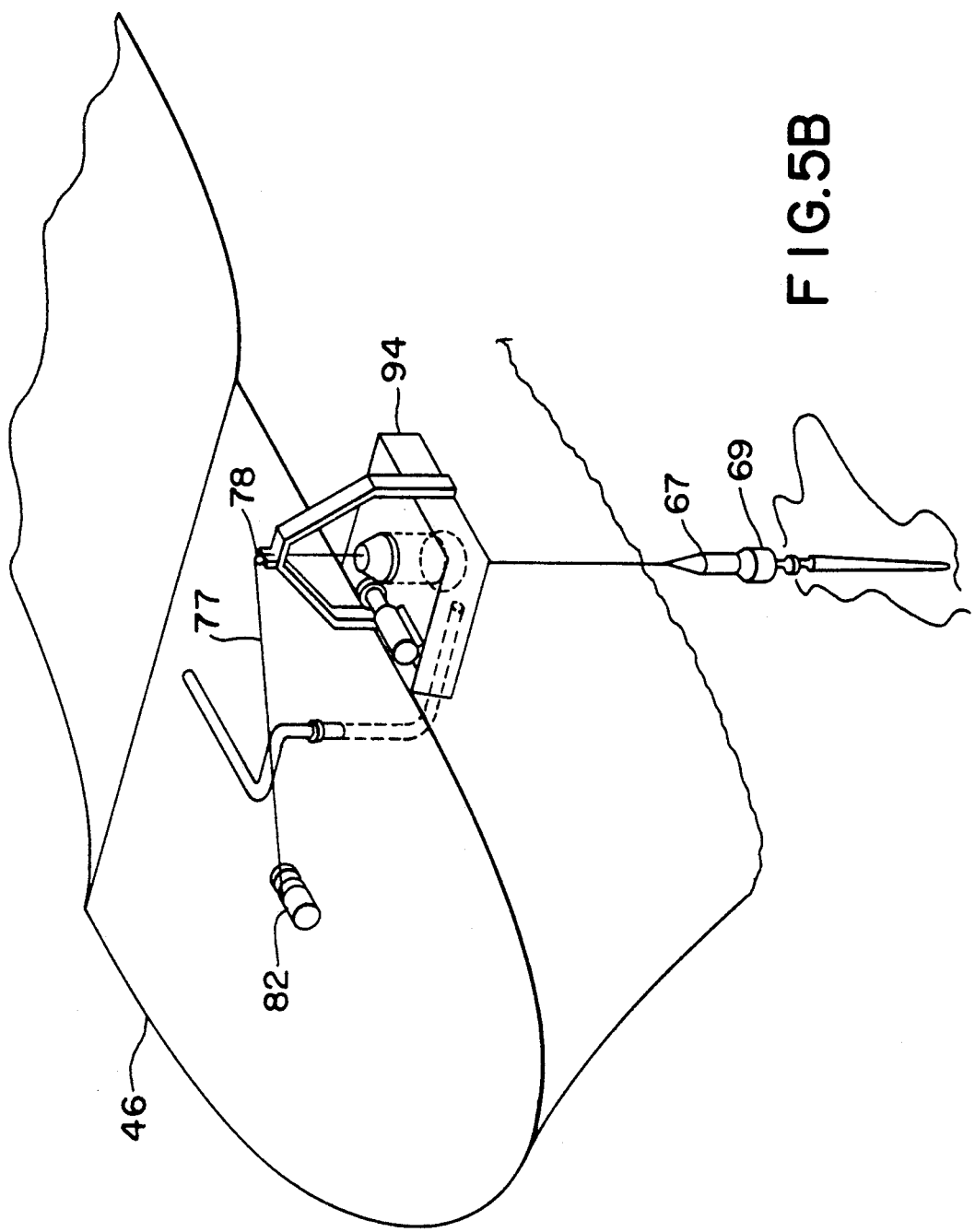
FIG. 5B is a schematic view showing the housing on board the ship for receiving the upper hose section.
Figure 6:
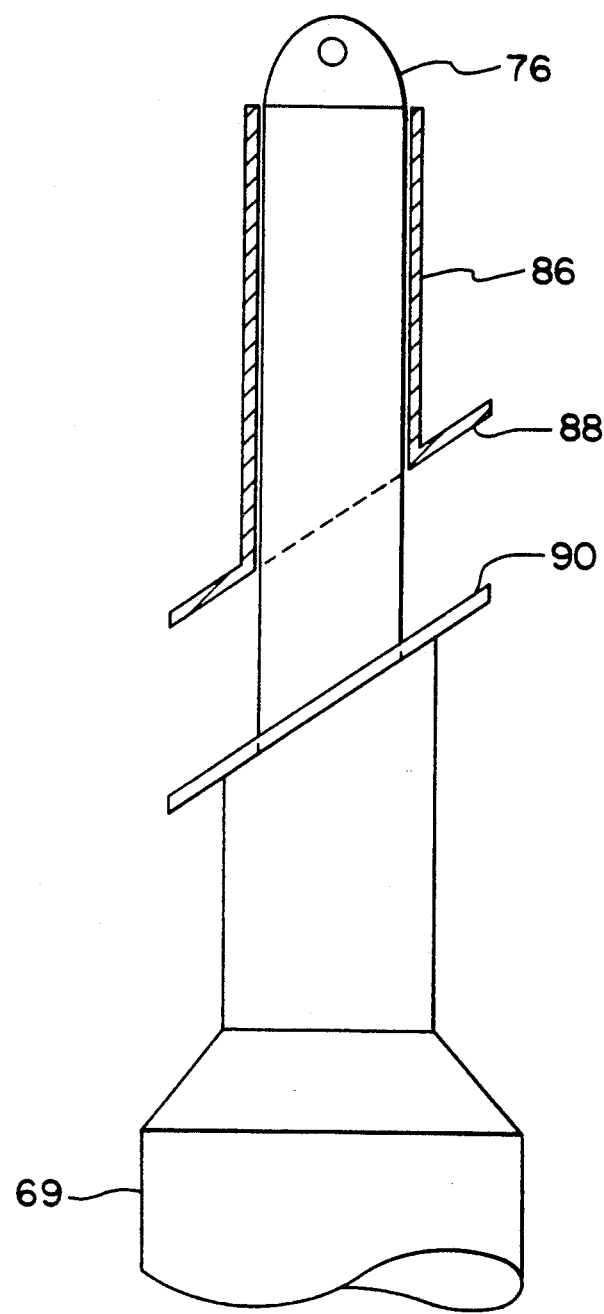
FIG. 6 is a partial sectional view of the upper end of the riser hose section illustrating the means for rotating the end into a preselected position with respect to a ship.

One form of the improved flexible loading system 10 of the present invention is illustrated in FIG. I. System 10 includes a pair of subsea pipelines 12 and 14 which terminate in pipeline end manifolds 16 and 18. Hoses 20 and 22 connect to manifolds 16 and 18, respectively, and extend to subsea buoyancy tanks 24 and 26 as shown. Catenary hoses 28 and 30 connect from buoyancy tanks 24 and 26 to central buoyancy tank 32 and riser hose section 34 extends thereabove to the connection coupling 32. Swivel 36 is positioned in the intermediate section of riser hose section 34. The opposed hose configurations 38 and 40 are on opposite sides of central buoyancy tank or spider frame 32, are interconnected and have about the same length so that the forces exerted on tank 32 are balanced and tend to return tank 32 to the same position when it is displaced. It should be noted that to ensure overall stability and avoid inducing of loads in the riser, the buoyancy of central buoyancy tank or spider frame should not be significant but limited to promote overall stability and avoid induced loads. Hoses configurations 38 and 40 may have any suitable identical configurations such as are well-known in the offshore oil industry under a variety of generic names (such as Steep S, Lazy S), and they may be combined with each other in their upper sections. Pickup line 42, which has sufficient buoyancy to keep it floating on the surface, is secured to upper coupling 44 to allow a tanker 46 as shown in FIG. 5B to make contact with coupling 44, and when upper coupling 44 is disconnected from the ship, it returns to a known position under the water surface, the depth of subsequent submergence of the upper termination being a function of the reserve buoyancy of the hose strings and its ancillary equipment.

Figure 1:
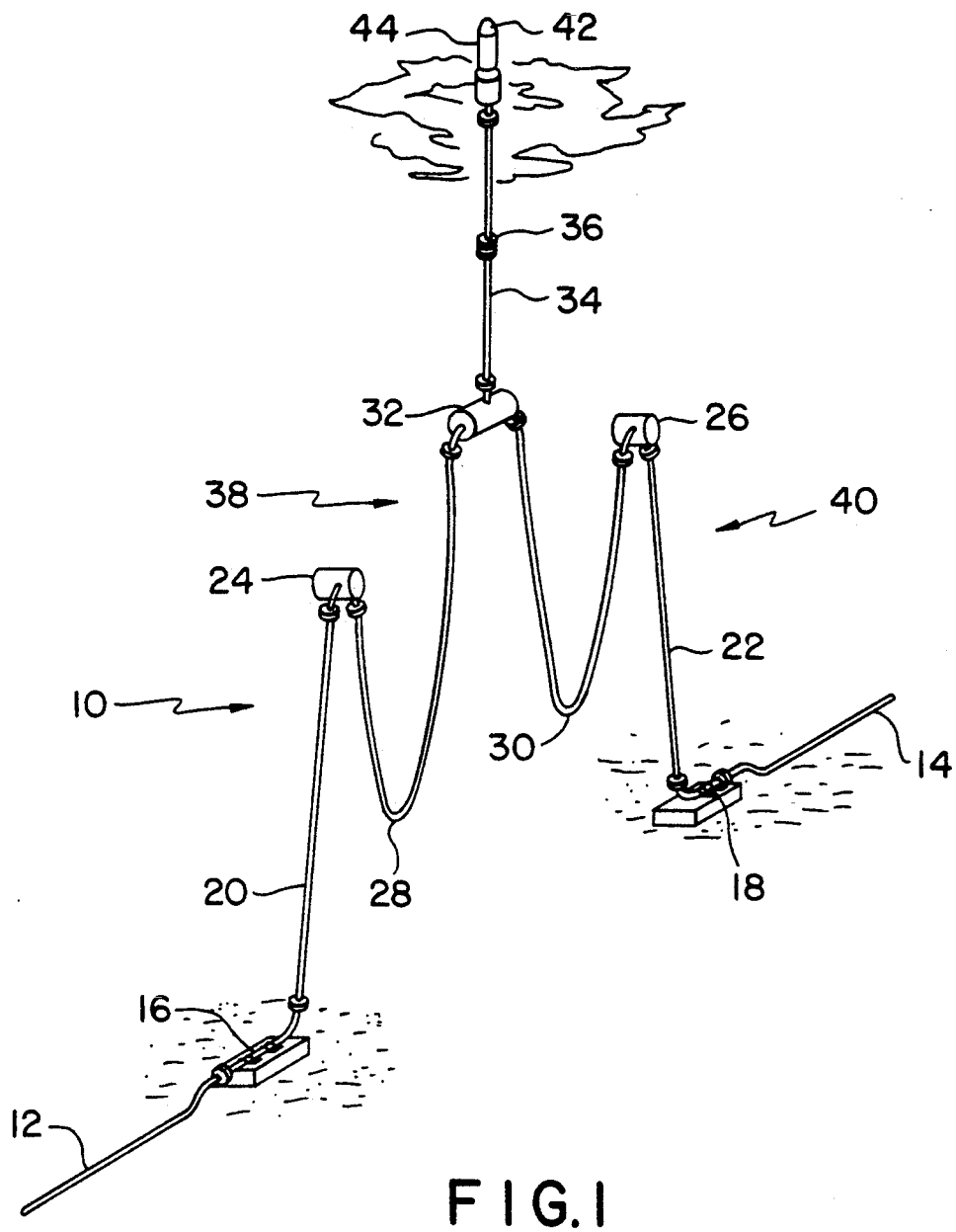
FIG. 1 is a schematic illustration of the improved mooring form of the present invention.
Figure 2:
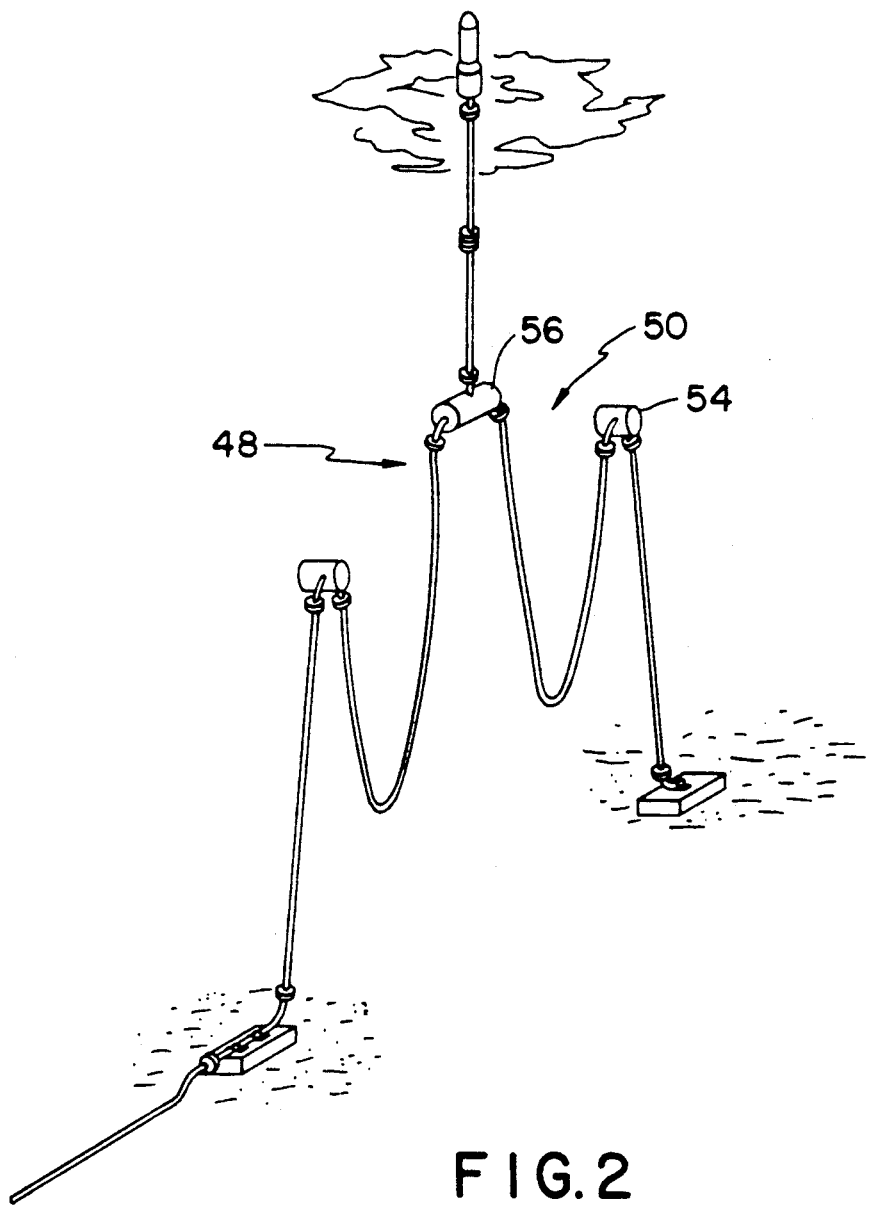
FIG. 2 is another schematic illustration of a modified form of the present invention.

Flexible loading system 46, shown in FIG. 2, is a modified form of the present invention which includes hose configuration 48 similar to hose configurations 38 and 40 and is balanced by configuration 50 connecting between anchor 52 and buoyancy tank 54 and connecting between tank 54 and central buoyancy tank 56 which connections are made at least in part or completely of chain or wire in such a manner that more or less identical configurations are provided.

Figure 3:
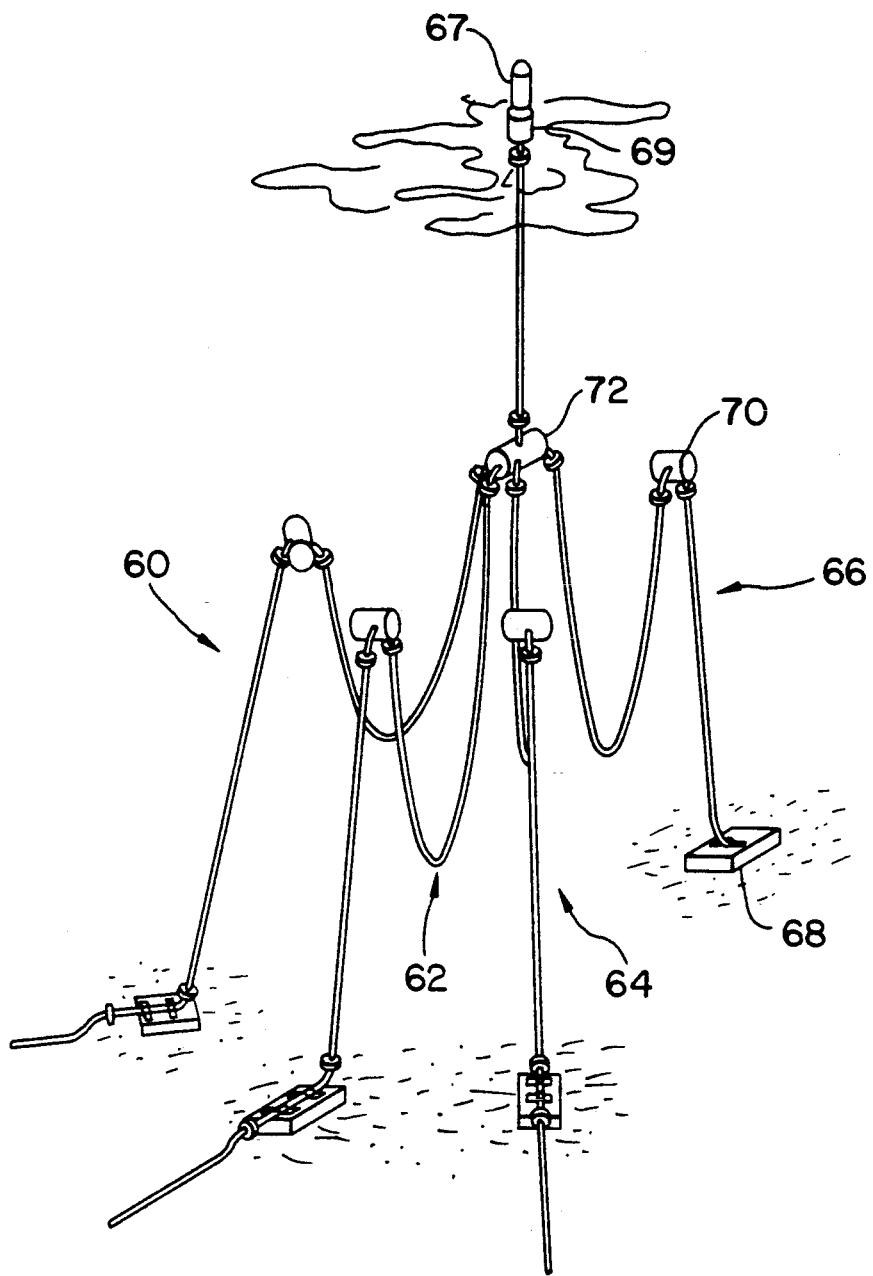
FIG. 3 is another schematic illustration of another modified form of the present invention.

Flexible loading system 58, shown in FIG. 3, is another modified form of the present invention which includes hose configurations 60, 62 and 64 which are similar to configurations 38 and 40. Configurations 60, 62 and 64 are balanced by chain or wire configuration 66 similar to configuration 50 which is connected from subsea anchor 68 to buoyancy tank 70 to central buoyancy tank 72, as shown. The balancing is such that the forces exerted on the central buoyancy tank allow the upper termination 74 of the riser section to return to a known position and a depth of submergence. The three hose configurations 60, 62, and 64, have a resultant force on central buoyancy tank 72 which is of the same magnitude and opposite direction as the force created by configuration 66. Any combination of hose and chain or wire configurations is satisfactory so long as they are balanced and allow the central buoyancy tank and upper termination of the riser section to return to the desired position.

Figure 4A:
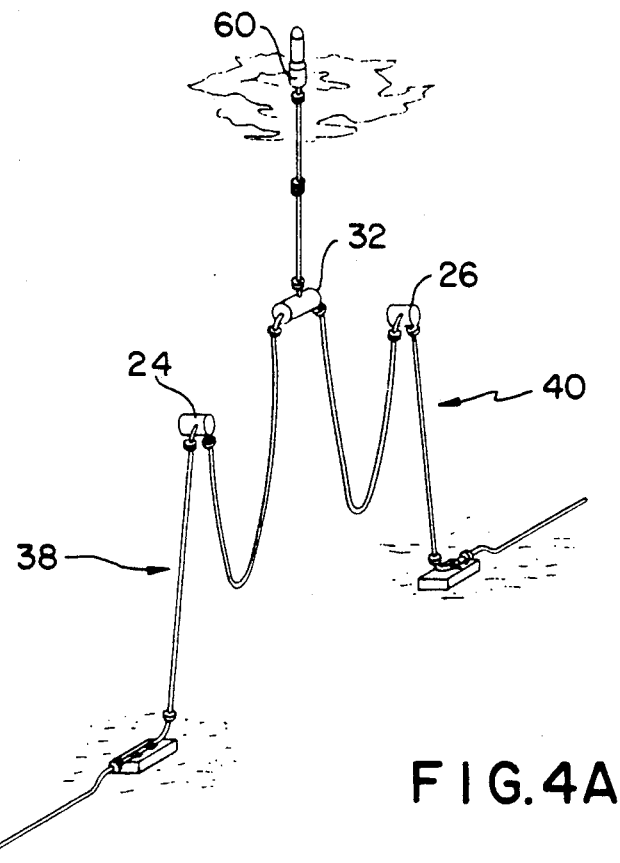
FIG. 4A is a schematic view that illustrates the normal position of the flexible loading system when it is not connected to a tanker.
Figure 4B:
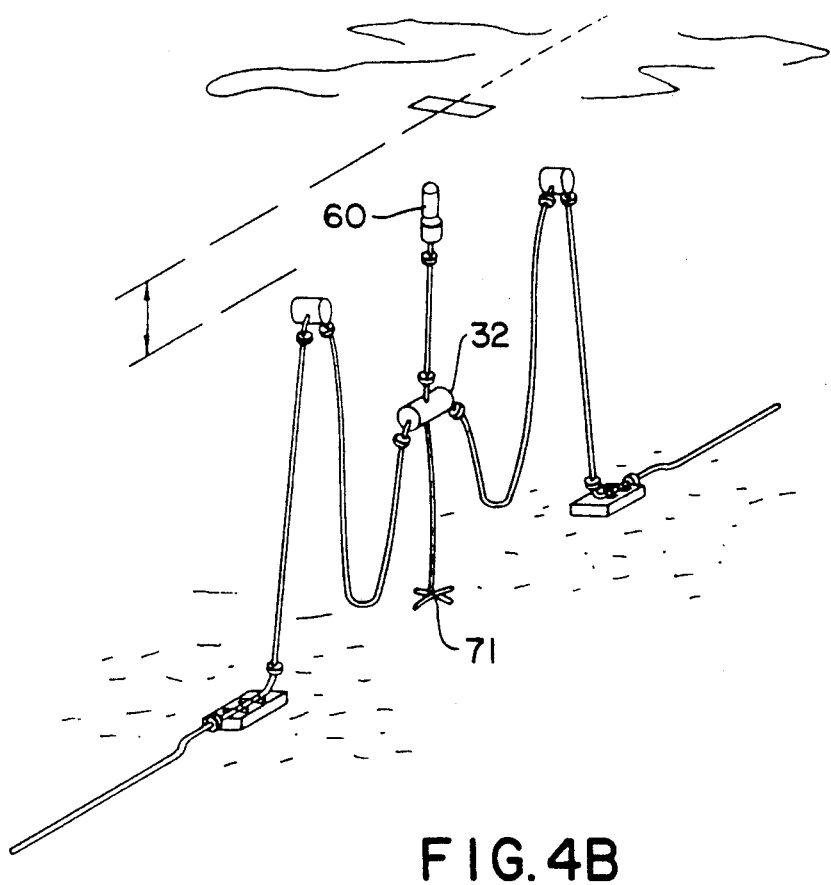
FIG. 4B is a similar schematic view illustrating the normal position of a modified flexible loading system when it is not connected to a tanker.

The upper part of riser hose section includes a connection body 67 and float 69 which are configured such that it can be drawn into a housing on the tanker with a single wire. This eliminates having to take over the weight of the risers by other hoisting means just to allow the make-up of the critical flowline connection. As shown in FIG. 4A, the system 10 is illustrated after the tanker has disconnected therefrom. The combined floatation of the float 69 and other components cause the connection body 67 to remain at or near the surface. When it is desired to have it submerge below the surface, sinker weight 71 is attached to central buoyancy tank 32 and cause it, on release by the tanker, to submerge the distance D below the surface, which prevents the pickup line from becoming entangled in the buoyancy volume and allows smooth pick-up operations. When the tanker disconnects, the sinker weight will pull the buoyancy volume down until the sinker rests on the seabed, and the buoyancy volume is then the distance D below the surface, and the self floating pick-up line departs upward to the surface without any potential for entanglement with the upper section of the flexible loading system.

As can be seen from FIGS. 5A and 5B, the upper end of the flexible loading system is provided with a nose 76 to a hoisting wire 77 which extends over pulley 78 directly above the opening and docking structure on turntable 80 to winch 82. The docking structure 84 includes receptacle 86 which is adapted to receive the nose 76 therein, and both the receptacle 86 and the nose 76 include mating flanges 88 and 90, respectively, which ensure that nose 76, when pulled completely into receptacle 86, has the proper rotary preselected position. Another manner of ensuring proper alignment is to draw the upper part of the connector body into the housing on the turntable and then rotate the turntable to align the flowline coupler with the coupler-half on the vessel. The coupling is then made up and the flow of oil can commence. As can be seen from FIG. 5B, tanker 46 includes winch 82 in a forward position aligned with cantilevered platform 94 on which turntable 80 and docking structure are mounted.

Figure 7:
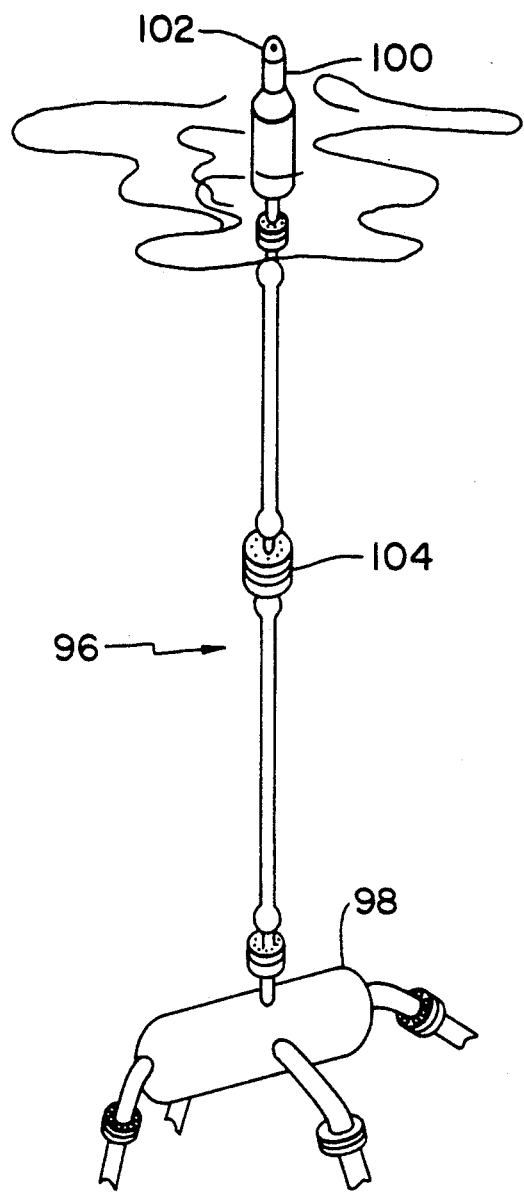
FIG. 7 is a schematic showing of the upper portion of the system of the present invention illustrating one form of the fluid swivel used therein.

Riser section 96, shown in FIG. 7, extends from central buoyancy tank 98 to the upper termination of the structure 100 which includes nose 102. Swivel 104 is positioned in an intermediate portion of riser section 96. Swivel 104 is used so that torsion in the hoses or a large disturbance in the configurations may be avoided Even with a dynamically positioned ship, it could still weathervane around the virtual mooring point in spite of its station-keeping capacity. It is recommended to use hoses with a relatively high torsional stiffness and that the swivel be designed to have a relatively low torsional resistance so that there is no need to provide an actively driven turntable on the ship from which to suspend the entire hose assembly during loading operations. The swivel seal is preferably a low friction seal and at a small diameter. Also, the opposed hoses are attached to a spider frame, such that the hose attachment offsets provide a large torsional resistance which depends more on axial hose tension than torsion stiffness of the hoses. This is particularly true in deep water applications.

Figure 7A:
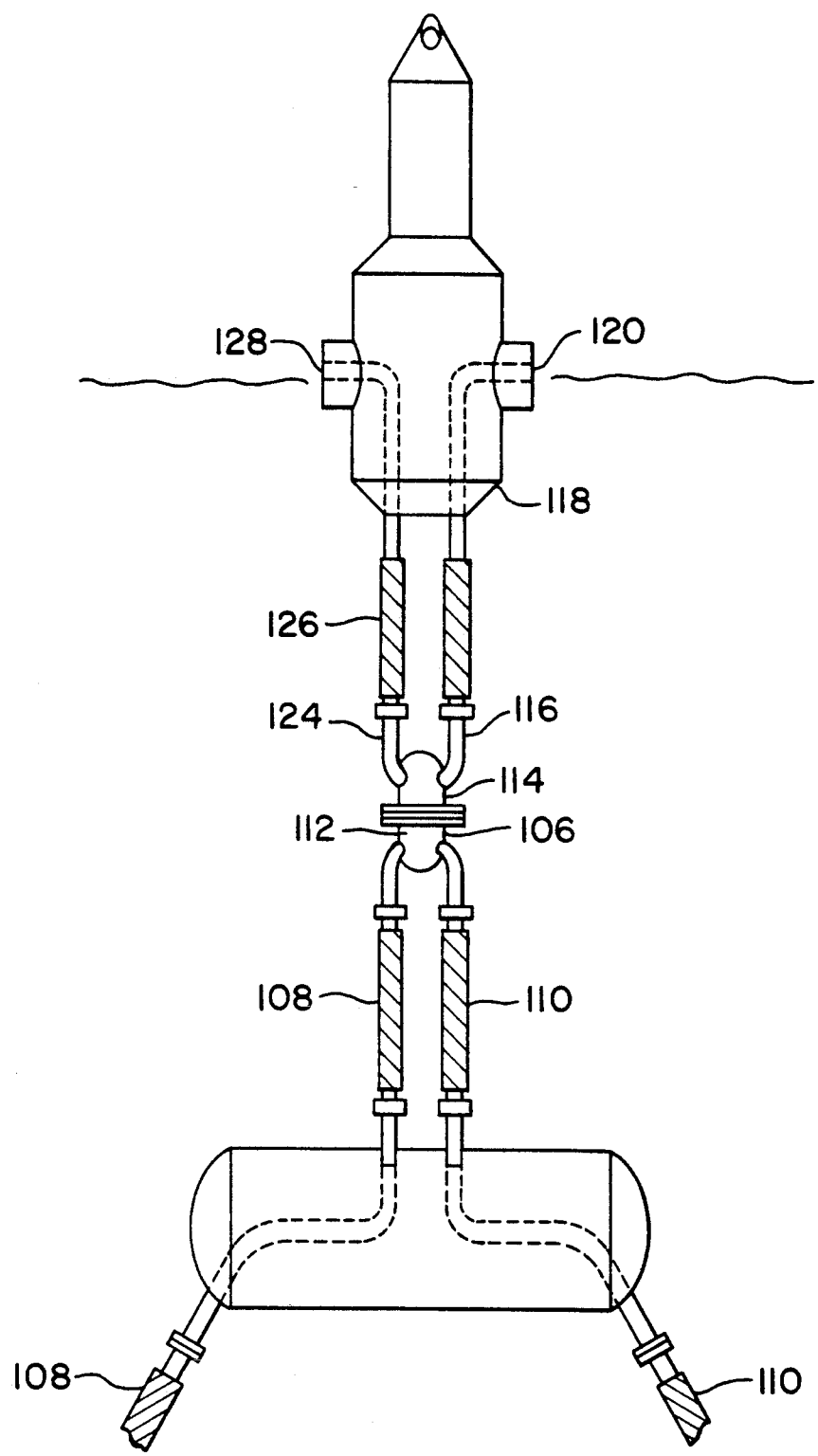
FIG. 7A is a schematic illustration of a modified riser section of the flexible loading system for a dual hose system.
Figure 7B:
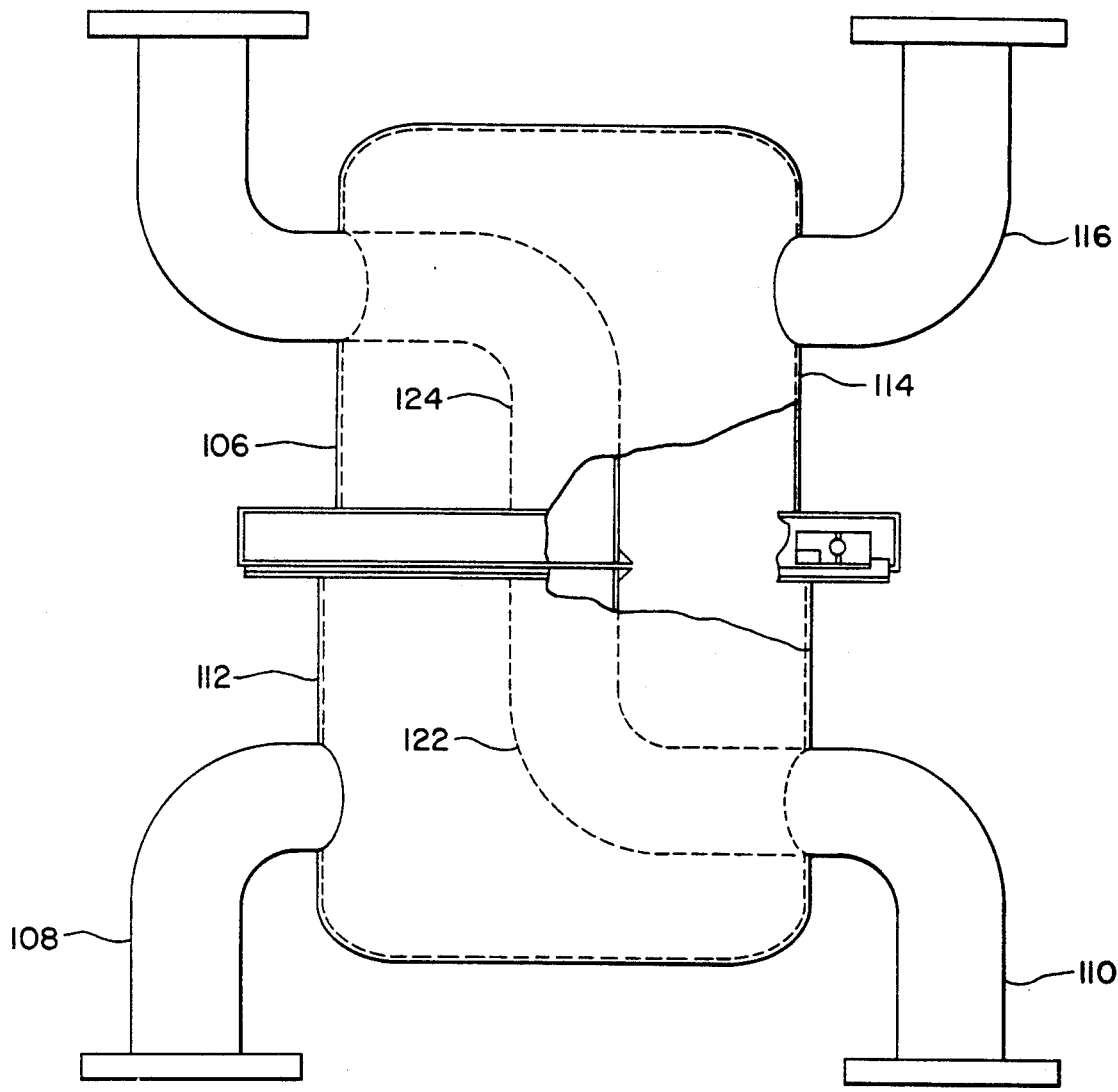
FIG. 7B is a detailed sectional view of the swivel used in the system shown in FIG. 7A.

When multiple hoses are being utilized, swivel 106, as shown in FIGS. 7A and 7B, may be used. In this modified system, hoses 108 and 110 connect into the lower portion 112 of swivel 106. Lower portion 112 and upper portion 114 are connected together to form a sealed structure and to allow relative rotation of the two portions. Hose 108 discharges into the interior of lower portion 112 and hose 116 connects into upper portion 114 to conduct fluid delivered by hose 108 to connector 118 for discharge through outlet 120. Hose 110 discharged into conductor 122 which extends through lower portion 112. Conductor 122 is connected to conductor 124 in a manner so that they are sealed to prevent leakage therefrom but can rotate with respect to each other. Conductor 124 communicates through upper portion 114 to hose 126 which communicates to connector 118 for discharge through outlet 128. While this illustrates one form of multiple line swivel, any other form may be suitable provided it does not have too large a resistance to relative rotation between its components. The use of multiple hoses may be advantageous to allow simultaneous production through separate hose strings within the overall configuration. A multiple passage fluid connection is then to be provided to allow the flow to remain separate until on board the tanker.

Figure 8A:
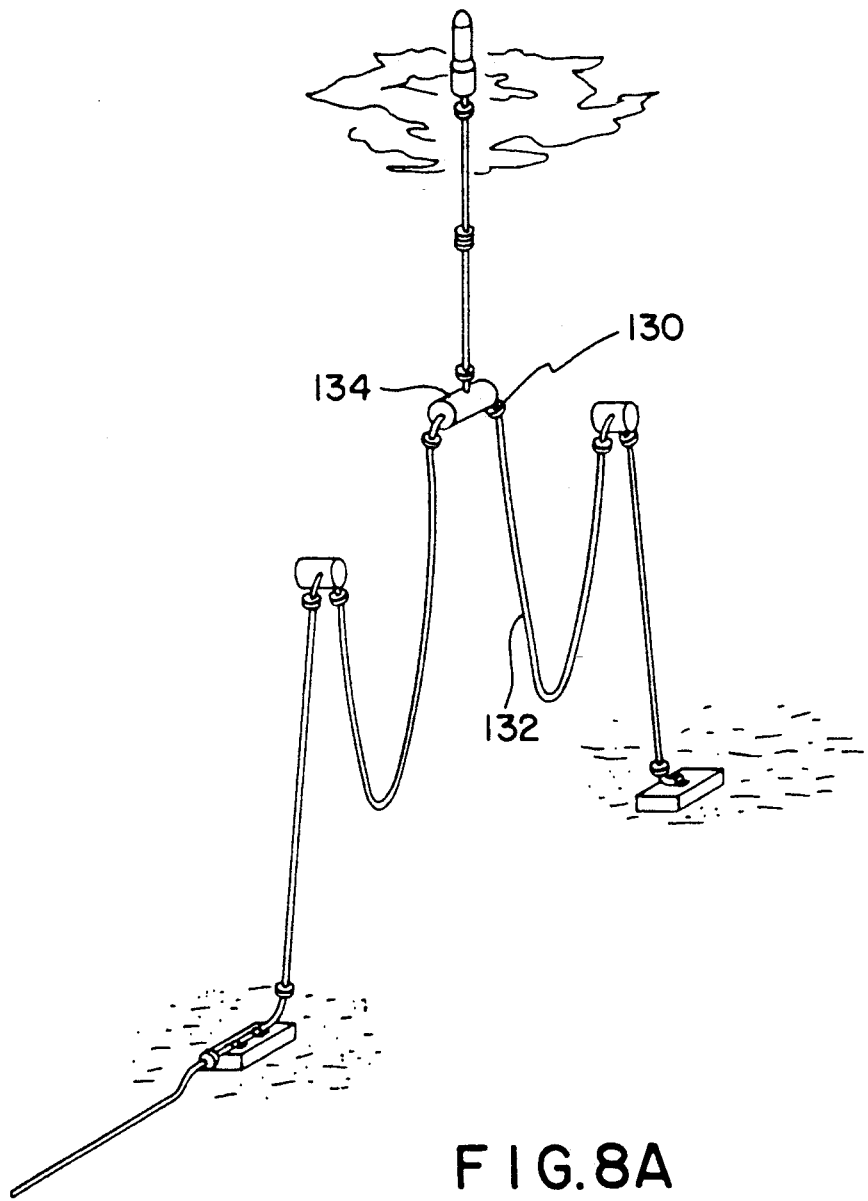
FIG. 8A is a schematic illustration of the flexible loading system with a pressure relief valve therein.
Figures 8B, 8C:
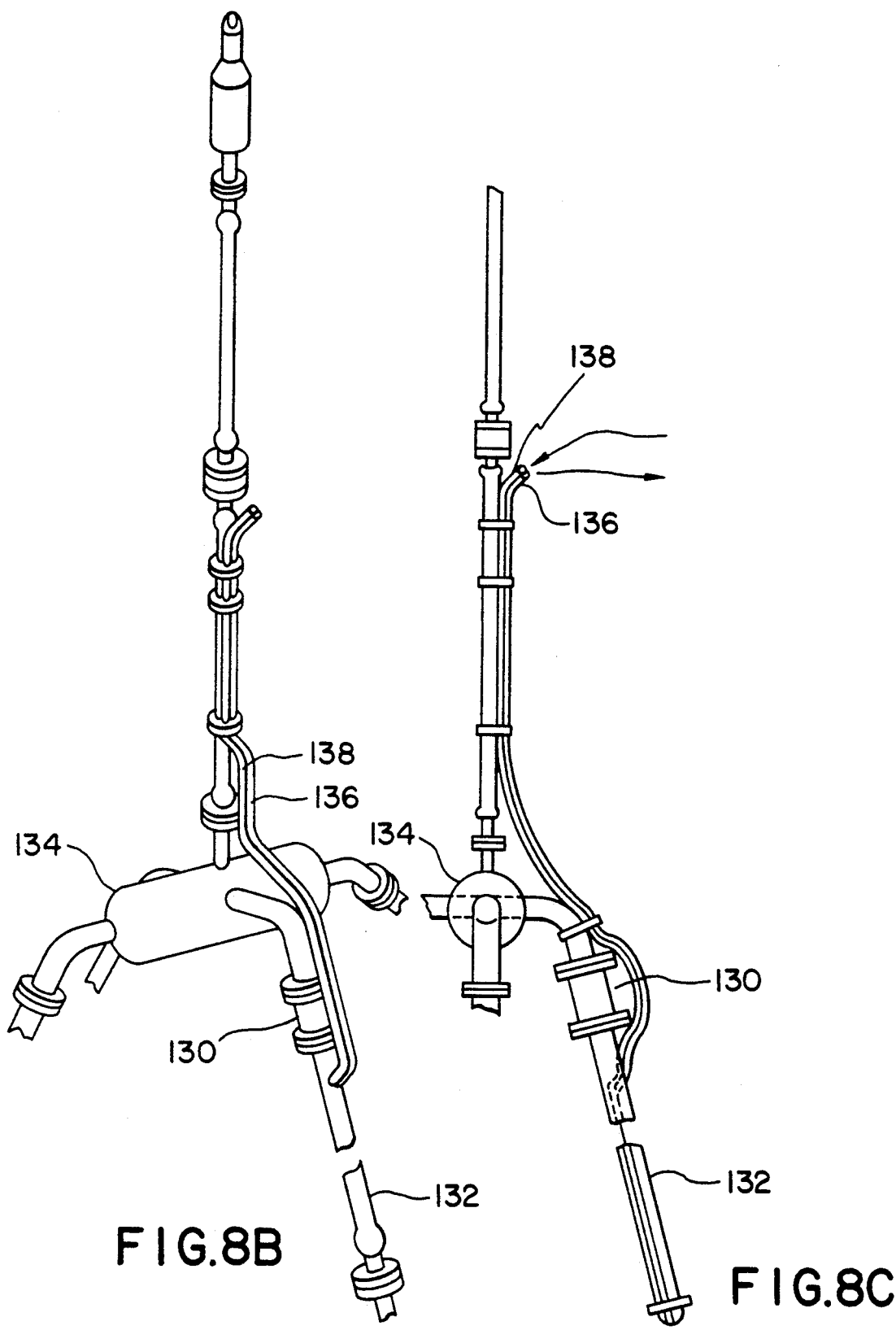
FIG. 8B is a detail illustration of the positioning of pressure relief valve in the flexible loading system.
FIG. 8C is another view of the system shown in FIG. 8B.

During flow of fluids from the subsea location through the improved flexible loading system of the present invention, any sudden disconnection, such as one initiated by a power blackout on the ship, may produce high surge pressures in the flexible loading system and its associated pipeline. This normally results from the fact that the disconnect coupler has a built-in shutoff valve which preferably close instantly upon disconnect while the flow continues since the pumps which transfer the fluid are not stopped immediately. For these reasons, pressure relief device 130 has been included in one of the hoses (132) leading to central buoyancy tank 134 as shown in FIGS. 8A and 8B. When pressure in the flexible loading system builds as described above, relief device or valve 130 opens and allows flow of fluids into hose 132 to vent the pressure in the system. Pressure relief valve 130 may be any suitable commercially available valve which allows flow to pass once a certain pressure is reached. It is a one-way valve. On reaching the pre-set relief pressure, the empty hose 132, which may be pressurized with air to prevent collapse due to external pressure, receives fluid from the normal flow line system. This prevents over-pressurization of the entire flow line system. The dual flow lines 136 and 138 connect to hose 132. Line 138 is shown to be used to inject air into hose 132, and line 136 is used to evacuate the vented fluids that have passed through valve 132 into hose 132. The fluid pumped from hose 132 is conducted into a suitable tank or container brought to the site for the specific use of removal of the vented fluids from the area.

Figure 9:
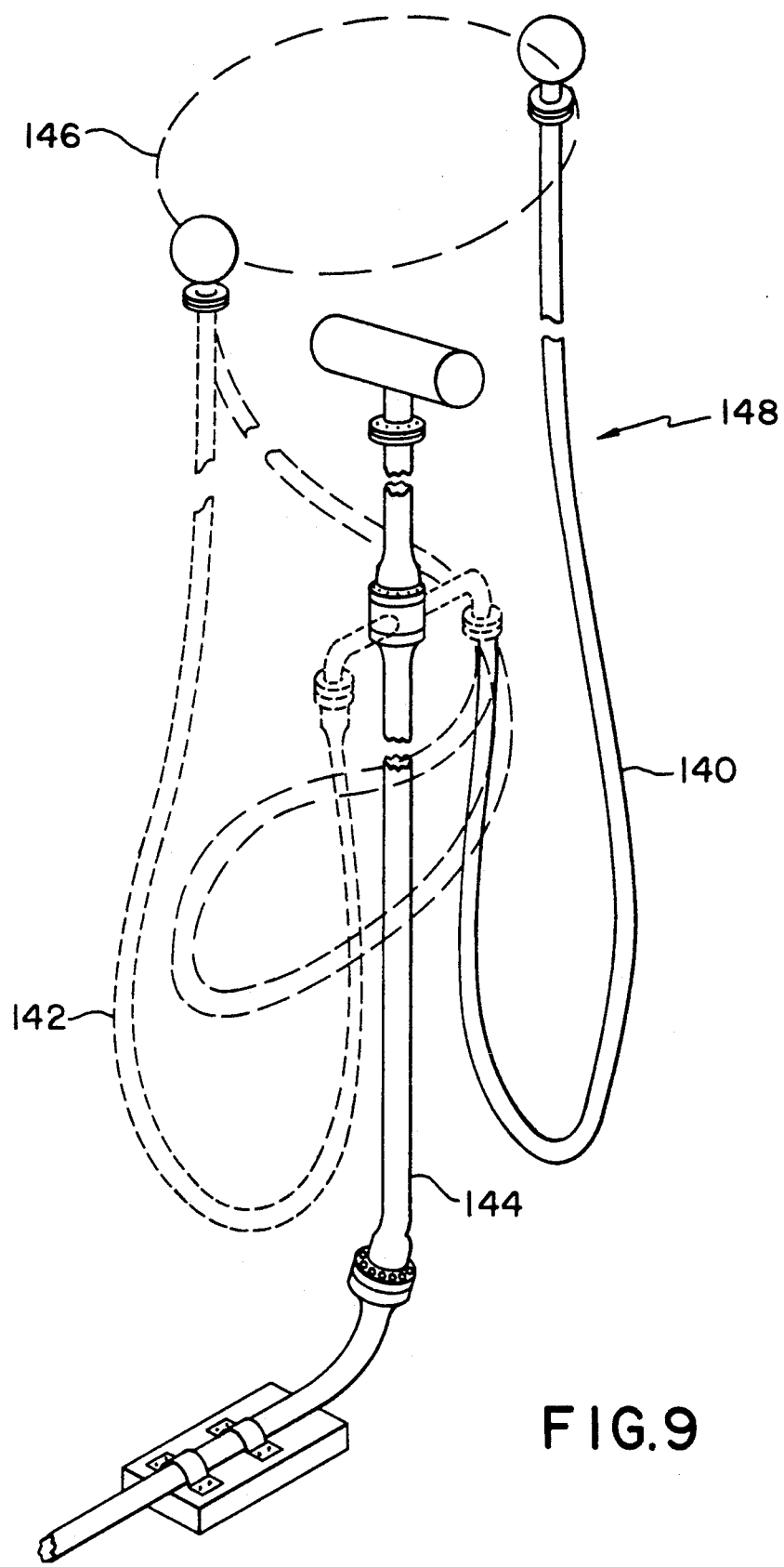
FIG. 9 is an illustration of prior art systems in which the hoses can easily become entangled and showing the central area which is not excluded from the tanker operating area.
Figure 10:
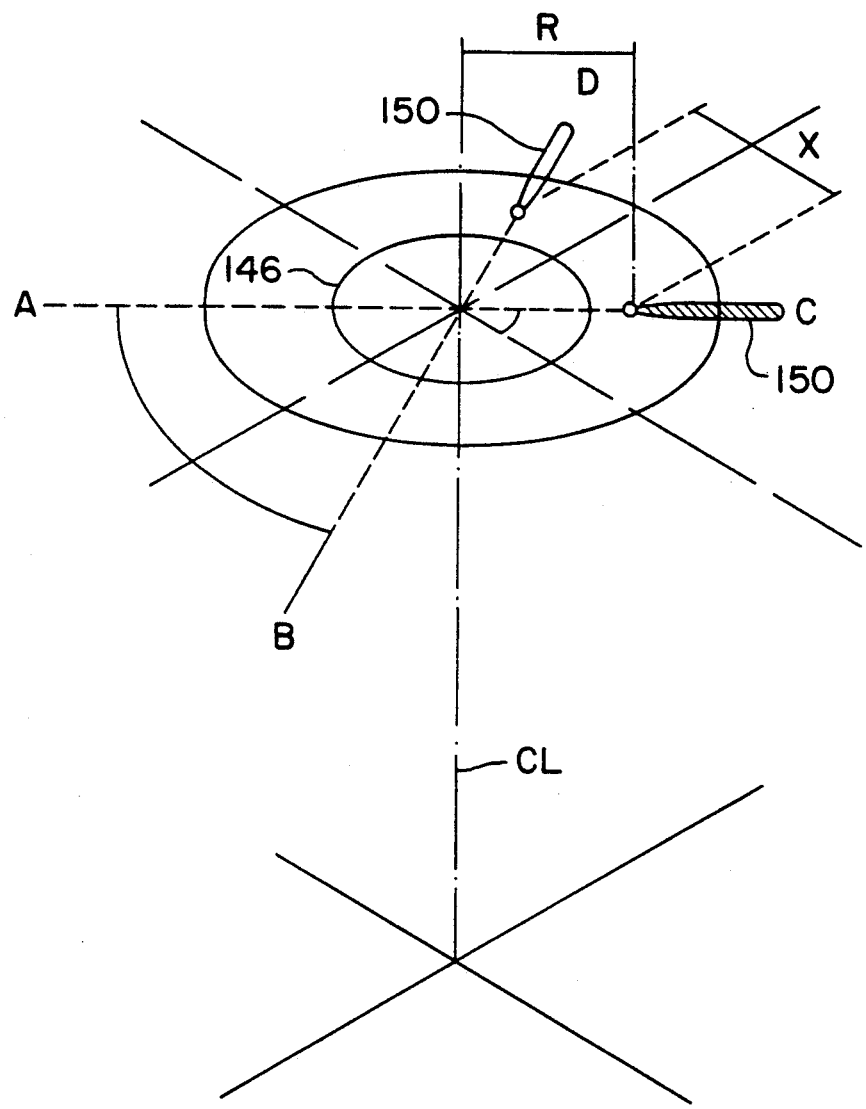
FIG. 10 is a diagram illustrating the tanker operating area of the prior art systems and showing the amount of movement required as a result of changes in the local environment.
Figure 11:
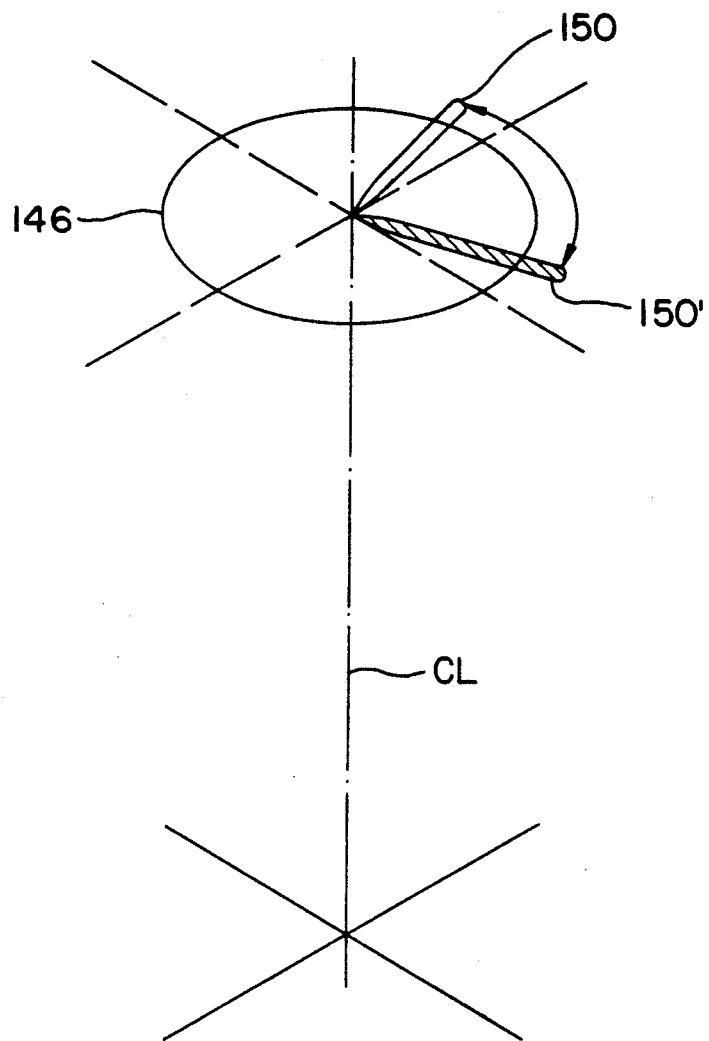
FIG. 11 is a diagram illustrating the tanker operating area of the system of the present invention and showing the relatively less travel required to accommodate a change in the tanker position responsive to the same change of the environment as is illustrated in FIG. 10.

The possibility of entanglement of the hoses 140 and 142 around riser 144 of the prior art is shown in FIG. 9. The circle 146 is the area that must be avoided by the tanker to ensure that the system 148 is not damaged thereby. The positions of the tanker shown in FIG. 10 illustrate the operation of a DP tanker with the loading system of the prior art, with the inner circle 146 being the area in which the tanker must not enter for fear of damaging the loading system. Two wind directions A and B are illustrated by arrows and the positions of tanker 150 designated C and D. The distance R is the radial dimension from the center line of the system CL which tanker 150 maintains in its station-keeping, and the dimension X is the chordal dimension which the tanker moves to change positions from C to D. In contrast to the operation shown in FIG. 10, FIG. 11 illustrates the station keeping of tanker 150' about the centerline of the system CL' when using the improved flexible loading system of the present invention. As can be seen, the tanker 150' may keep its bow in position on the center line CL' and merely have to pivot thereabout to change positions to accommodate for changes in tidal currents and wind.

What is claimed is:

1. An offshore tanker loading system for a tanker fitted with an overboard arm which supports the system by means of a disconnectable coupling, said system comprising an approximately symmetrical, oppositely extending towards the sea floor flexible catenary type arrangement, which is capable of conveying fluid from the sea floor to the tanker, the opposing parts of the catenary arrangement being connected to each other such that an approximately high restraint against twist around a vertical axis is obtain, said catenary arrangement including in its upper section a disconnectable coupling and an unpowered fluid swivel connected between said catenary arrangement and said coupling allowing rotation of the coupling so that as a vessel connected thereto moves about said disconnectable coupling and below it the swivel allows the coupling to rotate with the tanker.

2. A system according to claim 1 wherein
said fluid swivel, said upper section of said flexible arrangement and said connected opposing catenary parts are interconnected to allow simultaneous but separate conveyance of fluid arriving from separate sources through separate parts of the flexible catenary arrangement.

3. A system according to claim 1 or 2 wherein said flexible arrangement includes
means for relieving pressure in the flexible lines, and
mans to store fluid passed through said pressure relief means so that storage is accommodated in the flexible loading system not being used for the transfer of fluids between the sea bed and the vessel.

4. A system according to claim 3 wherein said fluid storing means includes
means for transferring the stored fluids to a tanker.

5. A flexible loading system for providing fluid communication between a subsea pipeline and a surface vessel including
a first hose extending from the subsea pipeline to a first buoyancy tank,
a second hose extending from the first buoyancy tank to a central buoyancy tank,
a second buoyancy tank separate from said tanker,
means connecting said second buoyancy tank to the sea floor and to the central buoyancy tank whereby the forces exerted on said central buoyancy tank by said second hose and said connecting means are balanced to cause said central buoyancy tank to maintain in a preselected position,
a riser section extending upwardly from said central buoyancy tank, an unpowered swivel positioned in said riser section,
means on the upper termination of said riser section for engagement by a vessel on the surface to raise said upper termination onto the vessel to complete the communication for moving fluids between the subsea pipeline and the vessel.

6. A system according to claim 5 wherein said means for connecting between the sea floor to the second buoyancy tank includes
an anchor on the sea floor, and
lines extending from the anchor to the second buoyancy tank and from the second buoyancy tank to the central buoyancy tank to exert a force on said central buoyancy tank, balancing the force exerted thereon by said second hose in magnitude and opposite in direction.

7. A system according to claim 5 wherein said means for connecting includes
a third hose extending from a second subsea pipeline to the second buoyancy tank, and
a fourth hose extending from the second buoyancy tank to the central buoyancy tank, which fourth hose exerts a force on said central buoyancy tank balancing the force exerted thereon by said second hose in magnitude and opposite in direction.

8. A system according to claim 5 including
means for maintaining said central buoyancy tank at a level below the water surface which allows full movement of the vessel while connected to said riser section.

9. A system according to claim 5 including
a pressure relief system connected in the loading system to protect it from sudden excess pressures.

* * * * *